US012317022B2

(12) United States Patent
Real et al.

(10) Patent No.: US 12,317,022 B2
(45) Date of Patent: May 27, 2025

(54) RAISED FEATURE ON EARBUD BODY

(71) Applicant: BOSE CORPORATION, Framingham, MA (US)

(72) Inventors: Richmond Andrew Real, Uxbridge, MA (US); Colin Taylor Mosgrove, Needham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/674,812

(22) Filed: May 24, 2024

(65) Prior Publication Data

US 2024/0314481 A1 Sep. 19, 2024

Related U.S. Application Data

(63) Continuation of application No. 17/662,277, filed on May 6, 2022, now Pat. No. 12,047,723.

(51) Int. Cl.
*H04R 1/10* (2006.01)

(52) U.S. Cl.
CPC ......... *H04R 1/1016* (2013.01); *H04R 1/1025* (2013.01); *H04R 1/1058* (2013.01)

(58) Field of Classification Search
CPC ........ H04R 1/10; H04R 1/1016; H04R 25/02; H04R 2201/10; H04R 2225/025; H04R 2225/77; H04R 2460/17
See application file for complete search history.

(56) References Cited

U.S. PATENT DOCUMENTS 2,971,065 A * 2/1961 Busse .................. H04R 25/652 381/189
3,448,224 A 6/1969 Giller
5,347,584 A 9/1994 Narisawa
6,760,459 B2 7/2004 Bae
8,111,861 B2 2/2012 Lowry
8,340,338 B2 * 12/2012 Mlodzikowski ..... H04R 1/1016 381/328
8,550,206 B2 10/2013 Keady et al.
9,467,761 B2 * 10/2016 Grinker ................ H04R 1/1058
9,848,258 B1 12/2017 Roadley-Battin et al.
(Continued)

FOREIGN PATENT DOCUMENTS

CN 111601203 A 8/2020
CN 115002589 A 9/2022
(Continued)

OTHER PUBLICATIONS

International Search Report and Written Opinion for International Application No. PCT/US2023/021118 dated Aug. 14, 2023.

*Primary Examiner* — Ryan Robinson
(74) *Attorney, Agent, or Firm* — Patterson + Sheridan, LLP

(57) ABSTRACT

Aspects describe a raised feature to help a user remove an in-ear audio output device from a case. Aspects describe a device comprising an earbud housing shaped to fit in a concha of an ear of a wearer of the device, and a body coupled to the earbud housing, the body extending away from an ear canal of the wearer and oriented outside of the ear when the device is worn, the body comprising a top cap comprising a flat external portion and a raised feature proximate to a concha cymba of the wearer and external to the ear when the device is worn.

20 Claims, 9 Drawing Sheets

(56) References Cited

U.S. PATENT DOCUMENTS

| | | | | |
|---|---|---|---|---|
| 10,582,287 | B2 | 3/2020 | Song et al. | |
| 10,835,931 | B2 | 11/2020 | Aase et al. | |
| 11,456,608 | B2 | 9/2022 | Rhee et al. | |
| 2008/0019556 | A1* | 1/2008 | Moon | H04R 1/1091 381/384 |
| 2008/0187162 | A1 | 8/2008 | Lee | |
| 2011/0249855 | A1* | 10/2011 | Tamura | H04R 1/1016 381/380 |
| 2012/0087511 | A1* | 4/2012 | Lumsden | H04R 1/1083 381/74 |
| 2016/0353216 | A1 | 12/2016 | Ruzicka et al. | |
| 2018/0338195 | A1* | 11/2018 | Rappoli | H04R 1/1066 |
| 2020/0128310 | A1 | 4/2020 | Umhoefer | |
| 2020/0304896 | A1 | 9/2020 | Cohen et al. | |
| 2021/0044885 | A1 | 2/2021 | Fukahori et al. | |
| 2022/0369008 | A1 | 11/2022 | Kim | |
| 2023/0067147 | A1 | 3/2023 | Choi et al. | |
| 2023/0111906 | A1* | 4/2023 | Takano | H04R 1/1016 381/74 |
| 2023/0276164 | A1* | 8/2023 | Wang | H04R 1/1016 381/74 |
| 2023/0308794 | A1* | 9/2023 | Yu | H04R 1/1016 |
| 2023/0370761 | A1* | 11/2023 | Li | H04R 1/1016 |

FOREIGN PATENT DOCUMENTS

| | | | | | |
|---|---|---|---|---|---|
| EP | 3352479 | A1 | * | 7/2018 | |
| GB | 2082020 | A | * | 2/1982 | H04R 1/1016 |
| KR | 20230094099 | A | * | 6/2023 | |
| WO | 2012140921 | A1 | | 10/2012 | |
| WO | 2016111613 | A1 | | 7/2016 | |
| WO | 2019125918 | A1 | | 6/2019 | |
| WO | 2021215908 | A1 | | 10/2021 | |
| WO | WO-2021223831 | A1 | * | 11/2021 | H04R 1/105 |

* cited by examiner

RAISED FEATURE ON EARBUD BODY

CROSS-REFERENCE TO RELATED APPLICATION

This application is a continuation of U.S. patent application Ser. No. 17/662,277, filed May 6, 2022, which is incorporated by reference herein in its entirety.

FIELD

Aspects of the present disclosure describe a raised feature on an external surface of an earbud body. The feature allows a user to more easily remove earbuds from an earbud case. The placement of the feature does not alter existing design features of the device providing user comfort, fit and portability.

BACKGROUND

In-ear devices are small and designed to be comfortable and portable. Due to the size of the device and accompanying case, and smooth surfaces of in-ear devices, users may have difficulty gripping or pinching the device to remove it from the case. It is desirable to improve a user's ability to quickly and efficiently remove an in-ear device from a case.

SUMMARY

Aspects provide an in-ear audio output device including a raised feature that both does not contact human tissue and aids in removal of the device from a protective and/or charging case. Due to the location of the feature, it does not adversely impact the fit and comfort of the device in the wearer's ear. Further, the feature provides a surface for better adherence to the device, so that the device may be removed more easily from its case.

Aspects provide an in-ear audio output device, comprising: an earbud housing shaped to fit in a concha of an ear of a wearer of the device, and a body coupled to the earbud housing; the body extending away from an ear canal of the wearer and oriented outside of the ear when the device is worn; the body comprising a top cap comprising a flat external portion and a raised feature proximate to a concha cymba of the wearer and external to the ear when the device is worn.

In aspects, the raised feature comprises a crescent shaped feature. In aspects, the crescent shape features comprises a first point on a first end of the crescent shaped feature, a second point on a second end of the crescent shaped feature, and a middle portion between the first point and the second point, and the middle portion extends further from the flat external portion of the body as compared to the first point and the second point.

In aspects, at least a portion of the raised feature is at least 0.6 mm in height from the flat external portion. In aspects, the raised feature is less than or equal to 1 mm in height from the flat external portion.

In aspects, a bottom portion of the raised feature is contoured to a shape of a human figure. In aspects, the top cap comprises a cosmetic cap.

Aspects provide in-ear audio output device comprising: an earbud housing shaped to fit in a concha of an ear of a wearer of the device, and a body coupled to the earbud housing, the body extending away from an ear canal of the wearer and oriented outside of the ear when the device is worn, the body comprising a top cap comprising a flat external portion and a raised feature; and a charging case comprising a case bottom, a case top, and a hinge configured to allow the case top to pivot open and closed relative to the case bottom, wherein the raised feature protrudes from the case bottom when the in-ear audio output device is seated in the charging case.

In aspects, the case top pivots relative to the case bottom to a closed position and encases the raised feature when the in-ear audio output device is seated in the charging case.

In aspects, the raised feature is proximate to a concha cymba of the wearer and external to the ear when the device is worn. In aspects, the raised feature comprises a crescent shaped feature.

In aspects, the crescent shape feature comprises a first point on a first end of the crescent shaped feature, a second point on a second end of the crescent shaped feature, and a middle portion between the first point and the second point; and the middle portion extends further from the flat external portion of the body as compared to the first point and the second point.

In aspects, at least a portion of the raised feature is at least 0.6 mm in height from the flat external portion. In aspects, the raised feature is less than or equal to 1 mm in height from the flat external portion.

In aspects, a bottom portion of the raised feature is contoured to a shape of a human figure. In aspects, top cap comprises a cosmetic cap.

Aspects provide an in-ear audio output device, comprising: an earbud housing shaped to fit in a concha of an ear of a wearer of the device, and a body coupled to the earbud housing, the body extending away from an ear canal of the wearer and oriented outside of the ear when the device is worn, the body comprising a top cap comprising a flat external portion and a curved raised feature proximate to a concha cymba of the wearer, along a top perimeter of the top cap, and external to the ear when the device is worn.

In aspects, the curved raised feature comprises a crescent shaped feature. In aspects, the crescent shape feature comprises a first point on a first end of the crescent shaped feature, a second point on a second end of the crescent shaped feature, and a middle portion between the first point and the second point; and the middle portion extends further from the flat external portion of the body as compared to the first point and the second point.

In aspects, the curved raised feature is less than or equal to 1 mm in height from the flat external portion.

All examples and features mentioned herein can be combined in any technically possible manner. Other features, objects, and advantages will become apparent from the following detailed description, when read in connection with the following drawings.

DETAILED DESCRIPTION

In-ear audio output devices have become a prevalent part and convenient aspect of daily life. Some examples of such devices include audio headphones, hearing aids, hearing assistance headphones, noise-masking earbuds, and ANR headphones. In-ear devices allow hands-free listening, so that a user may listen to audio and/or block sound while doing something else. While working, people use in-ear devices to help concentrate and help avoid distracting others. Finally, in-ear devices are convenient while in transit or exercising due to their portability, wireless connectivity, and fit in a user's ear.

Given the small size of in-ear devices and desired portability, when not in-use, in-ear devices typically are stored in a compact protective case (e.g., carrying and/or charging cases). It is desirable for a user to be able to easily and efficiently remove an in-ear device from its case.

Figure 1:
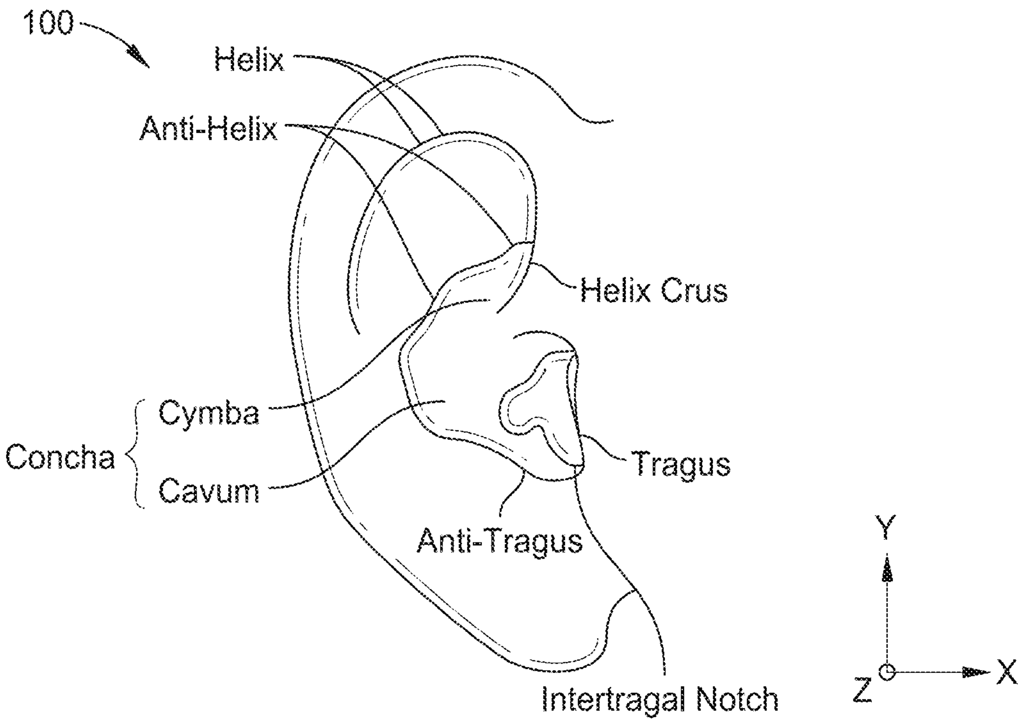
FIG. 1 is a view of the lateral surface of the human ear.

FIG. 1 shows the lateral surface of a human's right ear 100, with some features identified. There are many different ear sizes and geometries and include features not illustrated in FIG. 1. The in-ear audio output device described herein includes a body 202 that is coupled to an earbud housing 204. The body is configured to sit outside the human ear and the housing of the device is shaped to fit in the concha cavum.

Figure 2:
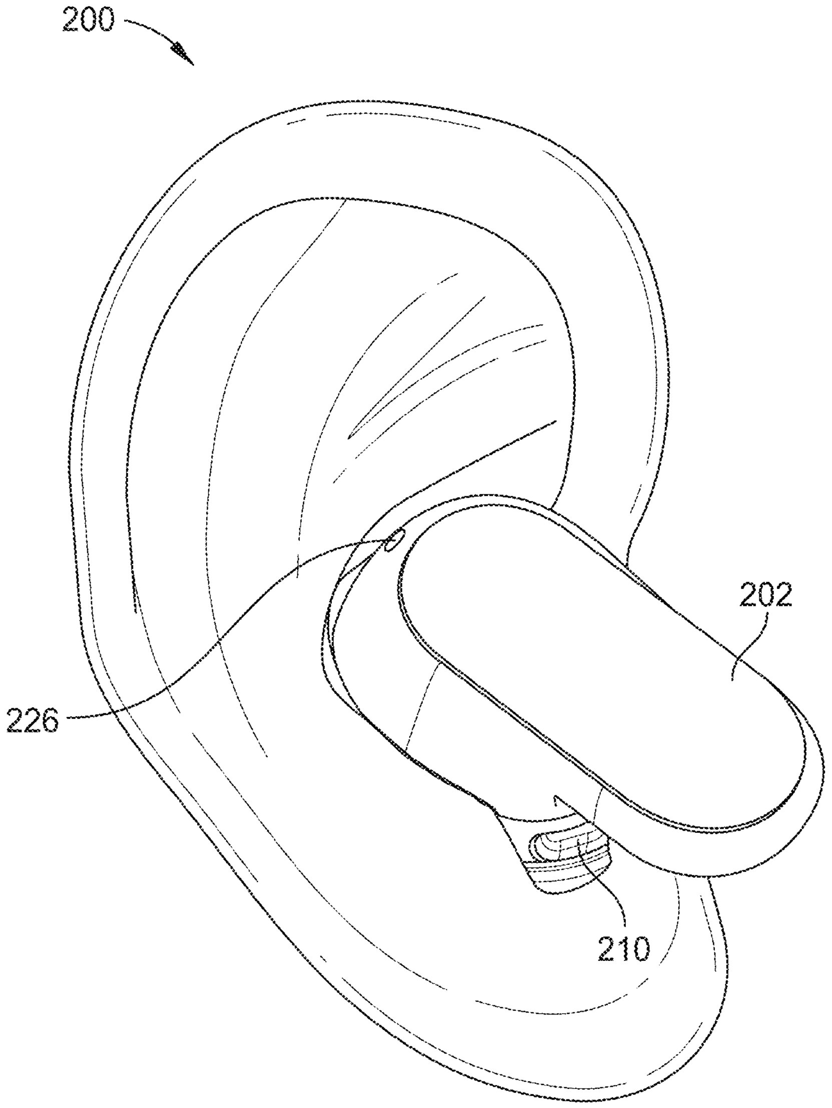
FIG. 2 is a back perspective of an in-ear audio output device including the earbud housing positioned in a wearer's ear.
Figure 3:
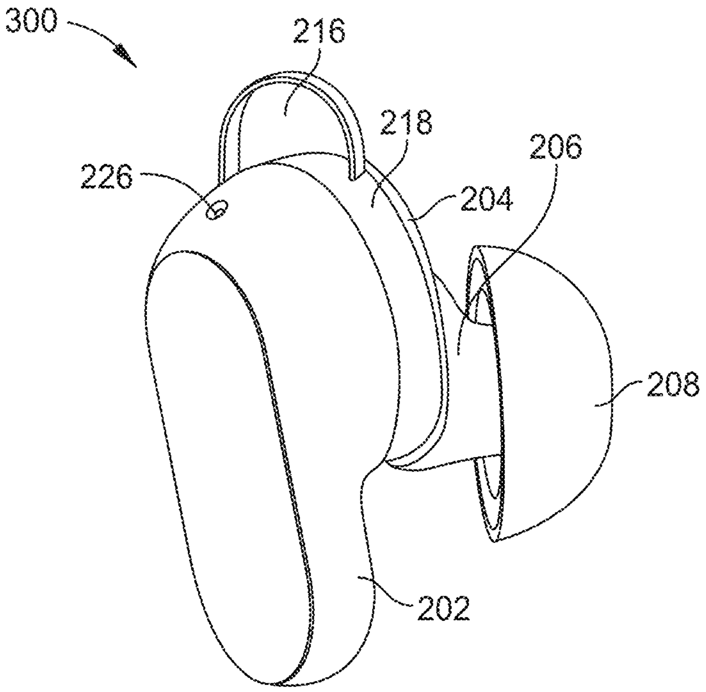
FIG. 3 is a side perspective of the in-ear audio output device including the earbud housing having acoustic ports and a stability band.
Figure 4:
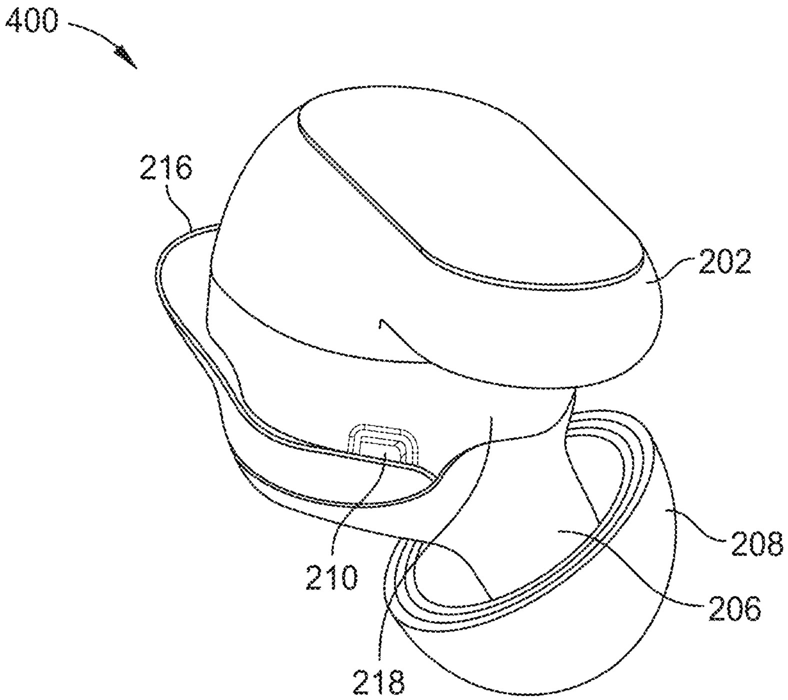
FIG. 4 is a bottom perspective of the in-ear audio output device including the earbud housing having acoustic ports and a stability band.

FIGS. 2-4 show an in-ear audio output device. FIG. 2 is a back perspective view 200 of the device positioned in a wearer's ear. FIG. 3 is a side perspective view 300 of the device. FIG. 4 is a bottom perspective view 400 of the device.

The device includes a body 202, an earbud housing 204, a nozzle 206, and a sealing structure 208.

The body 202 is coupled to an external surface of earbud housing 204 extending away from an ear canal of the wearer. As illustrated in FIG. 2, the body 202 is shaped like a rectangular pill and is situated outside the wearer's ear when the device is worn. When the device is worn, the body 202 is proximate to the concha and sits against the outside of the wearer's ear. In some cases, the body 202 sits against the wearer's face, to help hold the device in place. The external surface of the body 202 is called a top cap. The top cap is the portion of the body 202 that is visible to the outside world.

The top cap is a flat, or substantially flat, cosmetic cap. The cosmetic top cap covers a non-cosmetic, functional plate. In aspects, the functional plate covers a printed circuit board. The top cap provides a smooth, aesthetic external body while covering the functional plate.

In aspects, earbud housing 204 is shaped to extend toward and fit in the concha cavum. Earbud housing 204 defines an acoustic chamber which houses the acoustic driver and other electronics for the device.

The nozzle 206 extends from earbud housing 204 towards sealing structure 208. In aspects, earbud housing 204 extends into nozzle 206, or in other words, forms part of nozzle 206. Nozzle 206 includes an acoustic passage for sound waves to pass to the ear canal of the wearer. In aspects, nozzle 206 has a planar end with a substantially elliptical-shaped opening.

The sealing structure 208 creates a seal with a typical wearer's ear canal. Sealing structure 208 is substantially spherically-dome shaped. Sealing structure 208 extends from the planar end of nozzle 206 and folds back towards the wearer's outer ear.

In aspects, as illustrated in FIG. 2, when the device is inserted in the wearer's ear, resistive port 210 is aligned with the intertragal notch of the ear. The port 226 for a feedforward microphone may be situated outside the wearer's ear when the device is positioned in the wearer's ear. The device may include other non-illustrated ports such as, for example, a mass port.

In aspects, the in-ear audio output device includes a stability band 216. The stability band may include an attachment feature 218 used to attach the stability band 216 to the device, and more specifically, to the earbud housing 204. In aspects, stability band 216 is removably attached to earbud housing 204. In other words, attachment feature 218 allows stability band 216 to be removed and added to the audio device. In other aspects, attachment feature 218 is integrally formed with earbud housing 204.

Figure 5:
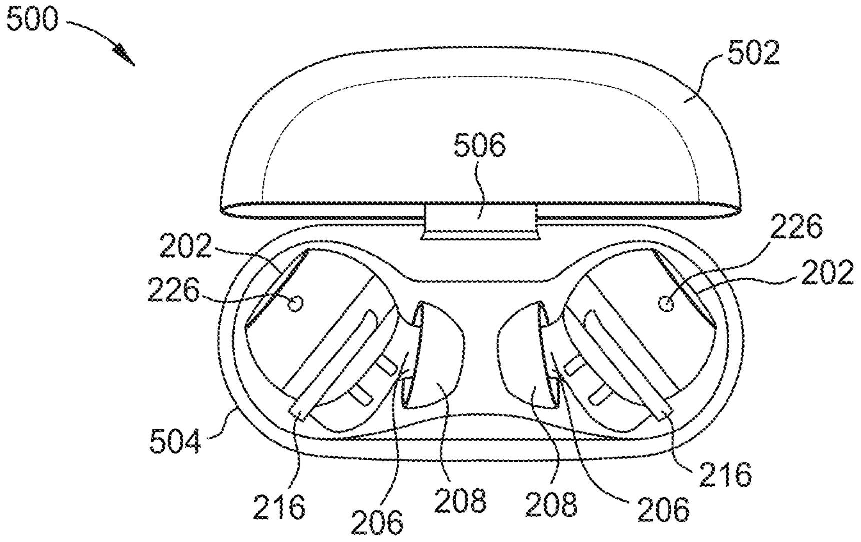
FIG. 5 is a top view of a charging case in an open position for a pair of in-ear audio output devices.
Figure 6:
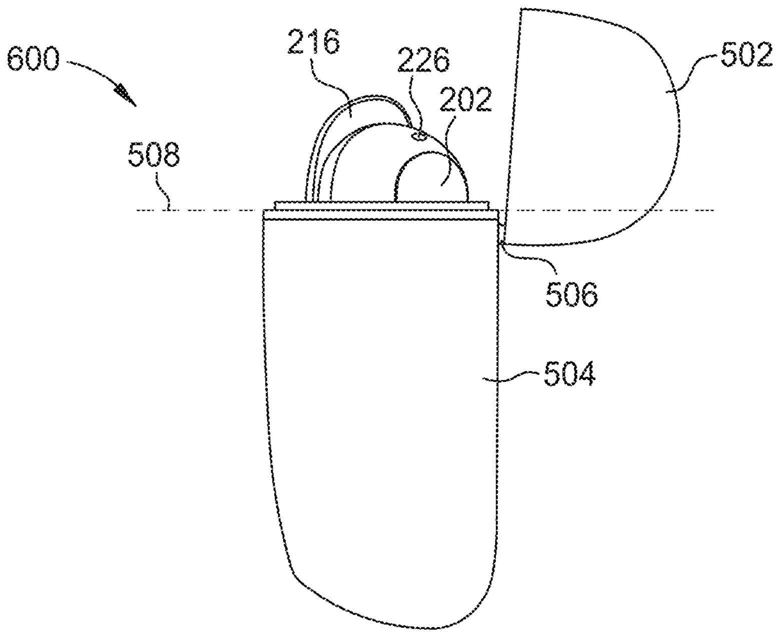
FIG. 6 is a side view of the charging case in an open position including an in-ear audio output device.
Figure 7:
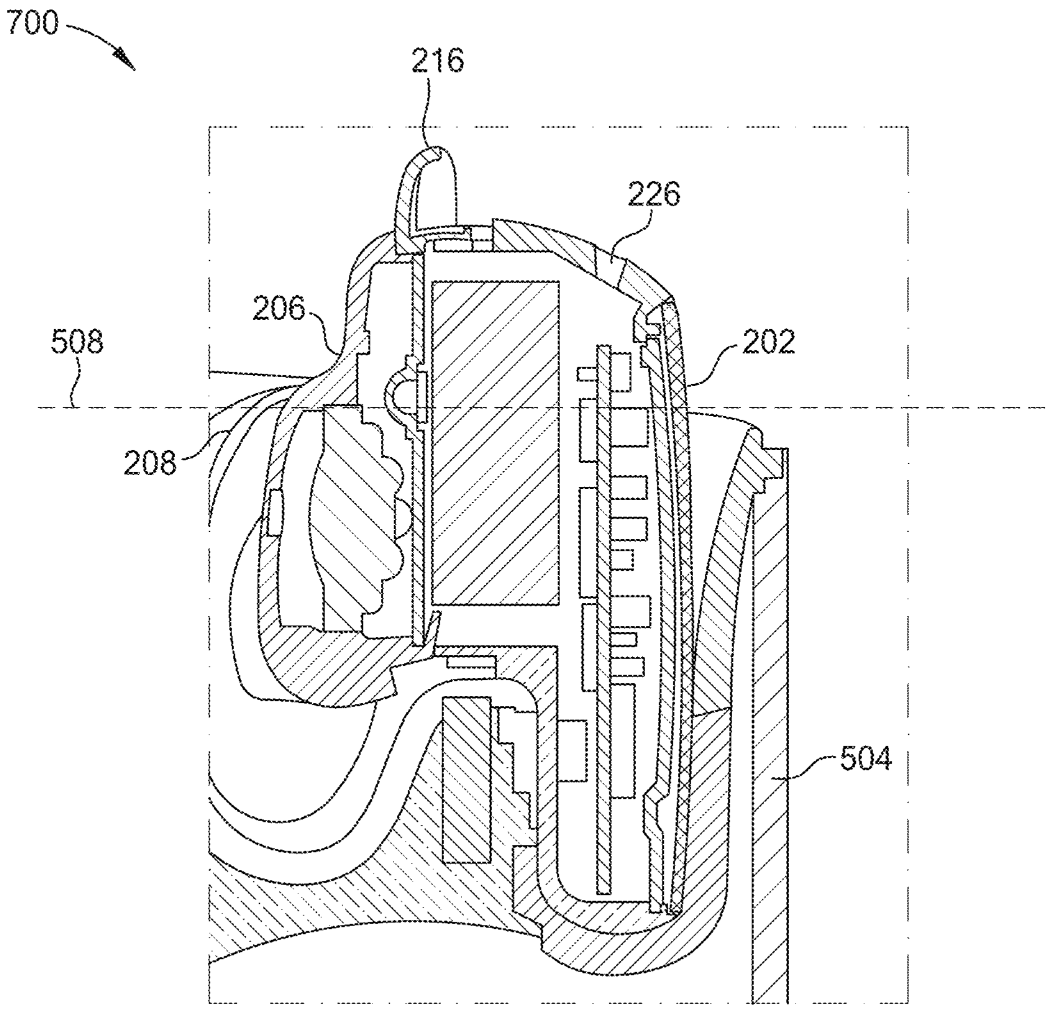
FIG. 7 is a cross section view of an in-ear audio output device disposed in the charging case.

FIG. 5 is a top view 500 of the device in a case that is in an open position. FIG. 6 is a side view 600 of the device in the case that is in an open position. FIG. 7 is a cross section 700 of the device in the case in an open position.

The case has a top portion 502, bottom portion 504, and a hinge 506. The top portion 502 pivots via the hinge 506 relative to a base portion 504 to open and close the case. As seen by the top view 500, the device is tightly constrained in the case. As illustrated in FIG. 6 and FIG. 7, when the case is in an open position, a small portion of the carbud body 202 extends from the top plane 508 of the bottom portion 504 of the case. To remove the device from the case, a user grips the body 202 and the housing 204 and pulls the device out of the case. In an example, each of the user's thumb and pointer finger grip or press on the body 202 and housing 204 of the device. Given the smooth surface of the body 202 and housing 204, and the position of the device in the case, the user may not be able to apply enough force to grip and remove the device from the case. In some cases, even though the user may successfully remove the device from the case, opportunities exist for a more comfortable and efficient user interaction with the device.

Therefore, aspects provide a feature to assist a user to more easily remove an in-car audio output device from its case. The feature does not interfere with how the device fits in the user's ear and does not create additional contact points with the user's body. Therefore, without compromising fit and comfort, the placement of the feature increases the user's ability to remove the device from the case.

Figure 8:
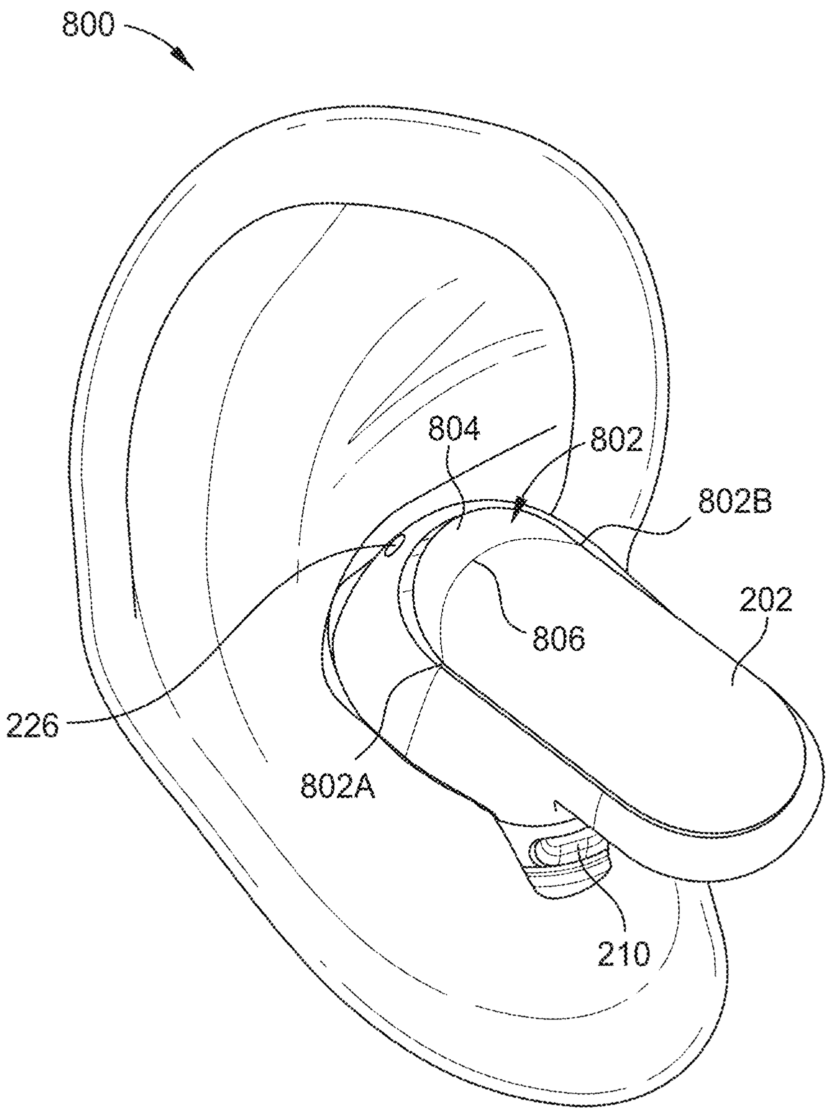
FIG. 8 is a back perspective of an in-ear audio output device including a raised feature on an external portion of the body, according to aspects of the present disclosure.
Figure 9:
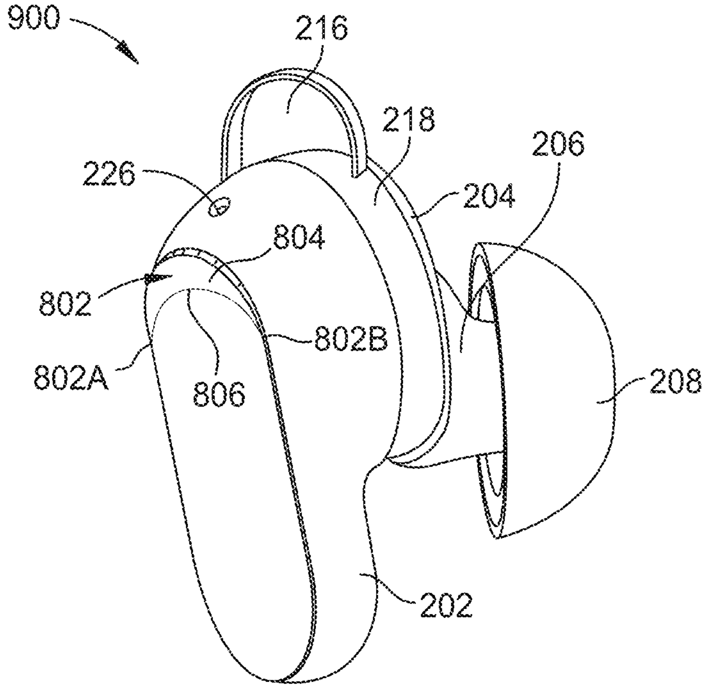
FIG. 9 is a side perspective of an in-ear audio output device including the raised feature, according to aspects of the present disclosure.
Figure 10:
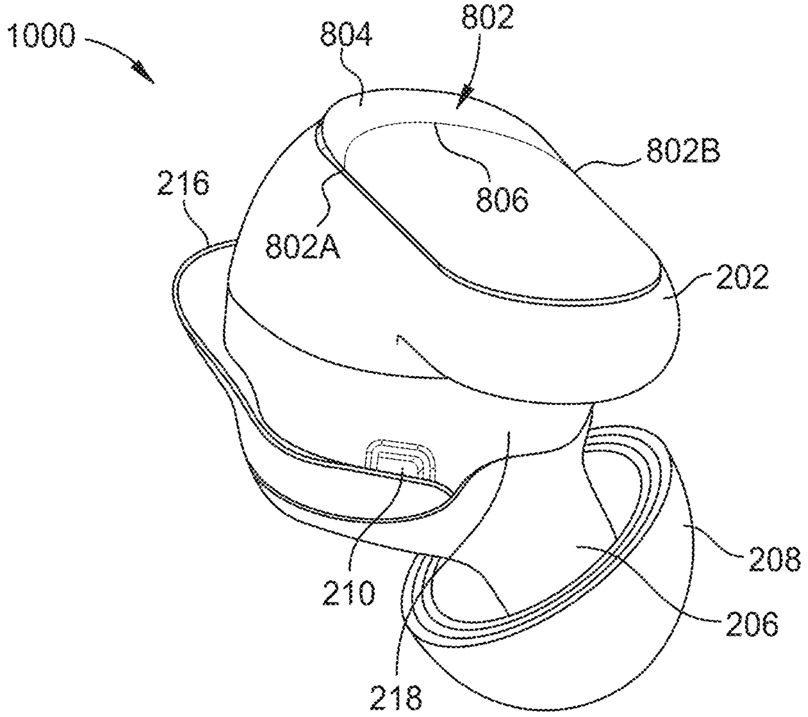
FIG. 10 is a bottom perspective of the in-ear audio output device including the raised feature, according to aspects of the present disclosure.

FIGS. 8-10 show an in-ear audio output device including a raised feature, according to aspects of the present disclosure. FIG. 8 is a back perspective view 800 of the device positioned in a wearer's ear. FIG. 9 a side perspective view 900 of the device. FIG. 10 is a bottom perspective view 1000 of the device.

In aspects, the body 202 includes a flat or substantially flat portion called the top cap (e.g., as described with reference to FIGS. 2-7) and a raised feature 802. The raised feature is positioned on the top outer surface of the body 202. When the device is worn, the feature 802 does not contact human skin. In aspects, the raised feature 802 is between 0.6 mm to 1 mm in height, measured from the outer surface of the body 202. The raised feature 802 may have a non-constant height.

In aspects the raised feature 802 is crescent shaped. The crescent shape has a first point 802*a* on a first end and a second point 802*b* on a second end and a middle portion 804 between the first point 802*a* and the second point 802*b*. In some designs, the middle portion 804 extends further from the body 202 as compared to the first point 802*a* and 802*b*. In an example, the middle portion 804 is approximately 0.6 mm to 1 mm in height from the surface of the body 202. The first point 802*a* and second point 802*b* taper from the middle portion 804. The bottom portion 806 of the feature (when the device is positioned in-ear) is contoured to the shape of a finger with the feature 802 and tapers from the middle portion 804 to each of the points 802*a* and 802*b*.

Figure 11:
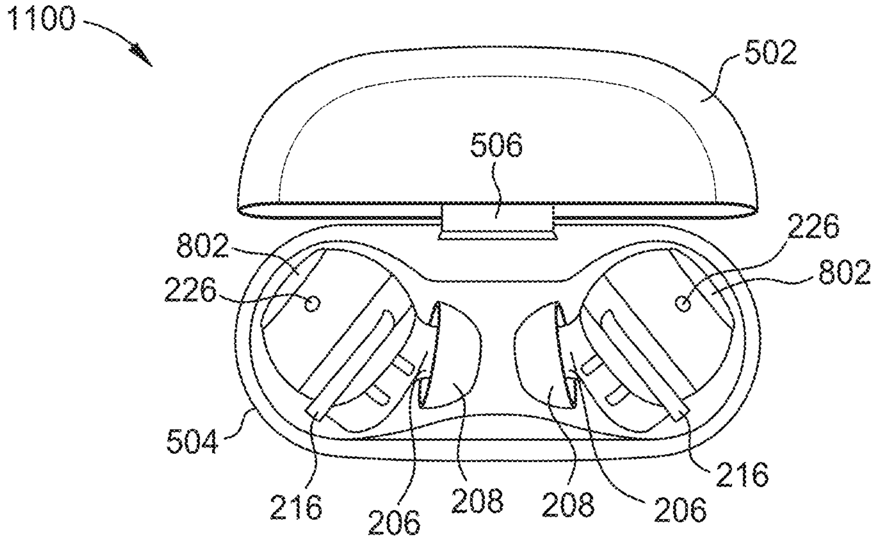
FIG. 11 is a top view of a charging case in an open position for a pair of in-ear audio output devices including the raised feature, according to aspects of the present disclosure.
Figure 12:
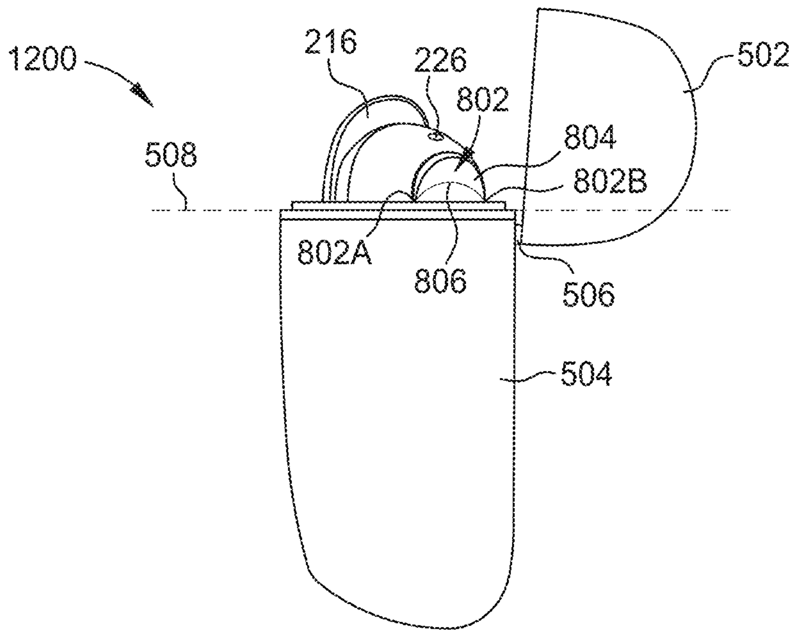
FIG. 12 is a side view of the charging case in an open position including an in-ear audio output device including the raised feature, according to aspects of the present disclosure.
Figure 13:
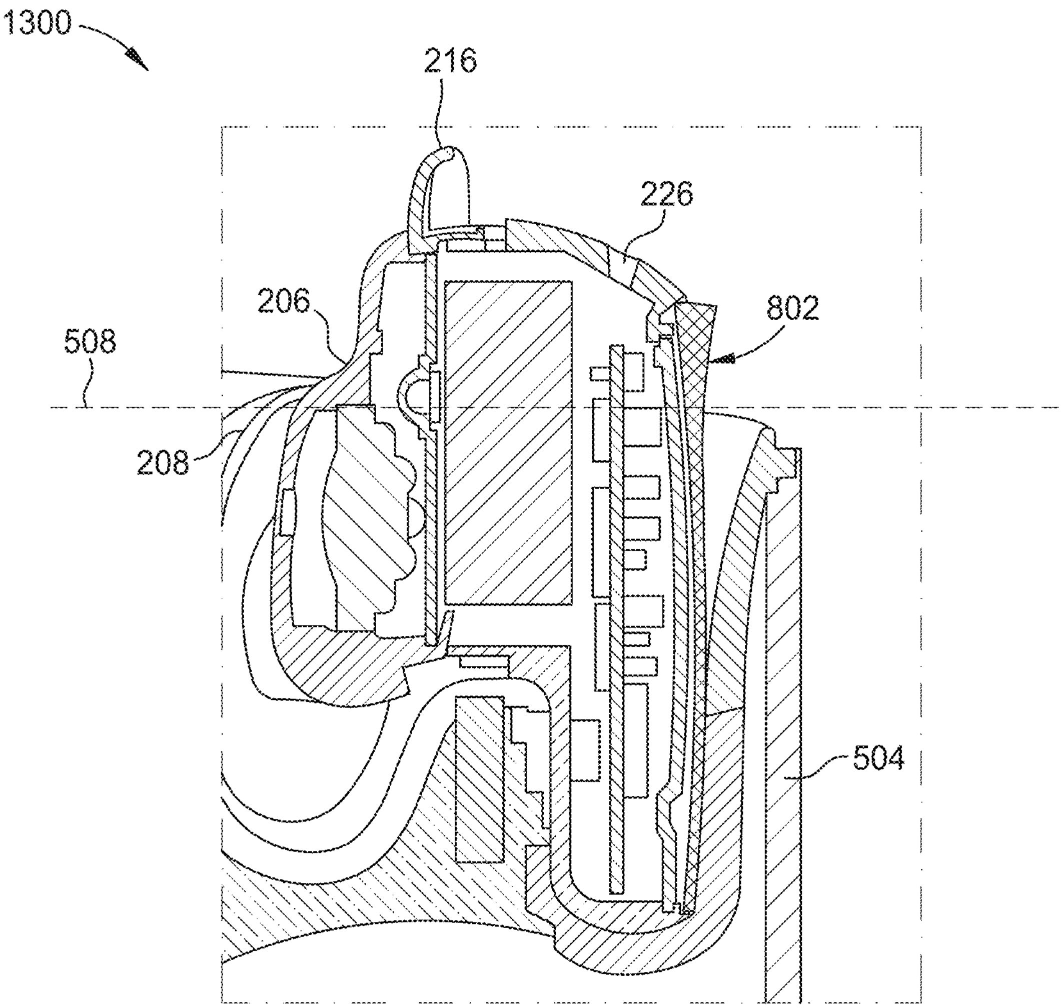
FIG. 13 is a cross section view of an in-ear audio output device including the raised feature disposed in the charging case, according to aspects of the present disclosure.

FIG. 11 is a top view 1100 of the device, including the raised feature 802, in a case that is in an open position. FIG. 12 is a side view 1200 of the device, including the raised feature 802, in the case that is in an open position. FIG. 13 is a cross section 1300 of the device, including the raised feature 802, in the case in an open position. Each of FIGS. 11-13 illustrate the minimal size and subtlety of the raised feature 802. As illustrated in, for example, FIG. 11, in the tightly constrained case, the device including the raised feature is virtually the same size as the device not including the feature. Therefore, the raised feature does not compromise case design.

As shown in FIGS. 12 and 13, the raised feature 802 sits slightly proud of the top plane 508 of the bottom portion 504 of the case when the case is open. When the case is opened, the raised feature 802 is exposed. The orientation of the raised feature 802 on the body 202 when the device is in the case allows the user to use the raised feature 802 as a grip to help remove the device from the case. Without the feature, the user may apply 1-1.5 N of force to remove the device. With the feature 802, the user may apply approximately 4-6 times the amount of force (e.g., 5-10 N) to remove the device from the case.

FIGS. 8-13 illustrate various aspects of a raised feature, on an external surface of a body of the device that does not come in contact with human tissue and provides a gripping surface for a user to more easily remove the device from a case. The feature, and aspects of the feature, may be applied to devices having a varied design as compared to the devices illustrated in FIGS. 2-4.

While the raised shape 802 is described and illustrated as a crescent shape, it may be any raised feature that provides a surface for a user to grip the device. When gripped, the raised feature offers affordance for a user's finger to remain in contact with the otherwise smooth body of the device, and not slide off the device. The feature is positioned on one of the few locations on an in-ear audio output device that will not come in contact with human skin. The size of the design remains largely unchanged. The ergonomics of the device is not impacted. Finally, the case for the device may remain the same. The size, orientation, and nature of the feature allow the device and case to maintain existing competitive advantages associated with size, fit, comfort, and design.

Numerous uses of and departures from the specific apparatus and techniques disclosed herein may be made without departing from the inventive concepts. Consequently, the invention is to be construed as embracing each and every novel feature and novel combination of features disclosed herein.

The invention claimed is:

1. An in-ear audio output device, comprising:
an earbud housing shaped to fit in a concha of an ear of a wearer of the device;
a body coupled to the earbud housing, the body extending away from an ear canal of the wearer and oriented outside of the ear when the device is worn, the body comprising a top cap comprising a top end oriented towards a helix of the wearer and a bottom end opposite the top end; and
a raised feature disposed on the top end of the top cap, the raised feature being proximate to a concha cymba of the wearer and external to the ear when the device is worn.

2. The in-ear audio output device of claim 1, wherein the raised feature is crescent shaped.

3. The in-ear audio output device of claim 2, wherein:
the raised feature comprises a first point on a first end of the crescent shaped feature, a second point on a second end of the crescent shaped feature, and a middle portion between the first point and the second point; and
the middle portion extends further from a flat external portion of the body as compared to the first point and the second point.

4. The in-ear audio output device of claim 1, wherein at least a portion of the raised feature is at least 0.6 mm in height from a flat external portion.

5. The in-ear audio output device of claim 1, wherein the raised feature is less than or equal to 1 mm in height from the flat external portion.

6. The in-ear audio output device of claim 1, wherein a bottom portion of the raised feature is contoured to a shape of a human finger.

7. The in-ear audio output device of claim 1, further comprising a removably attached stability feature disposed on an external surface of the earbud housing.

8. An in-ear audio output device, comprising:
an earbud housing shaped to fit in a concha of an ear of a wearer of the device; and
a body coupled to the earbud housing, the body extending away from an ear canal of the wearer and oriented outside of the ear when the device is worn, the body comprising a top cap comprising a flat external portion and a raised feature proximate to a concha cymba of the wearer and external to the ear when the device is worn, wherein the raised feature comprises a first point on a first end of the raised feature, a second point on a second end of the raised feature, and a middle portion between the first point and the second point, and wherein the middle portion extends further from the flat external portion of the body as compared to the first point and the second point.

9. The in-ear audio output device of claim 8, wherein the raised feature is crescent shaped.

10. The in-ear audio output device of claim 8, wherein the middle portion of the raised feature is at least 0.6 mm in height from a flat external portion.

11. The in-ear audio output device of claim 8, wherein the raised feature is less than or equal to 1 mm in height from a flat external portion.

12. The in-ear audio output device of claim 8, wherein a bottom portion of the raised feature is contoured to a shape of a human finger.

13. The in-ear audio output device of claim 8, further comprising a removably attached stability feature disposed on an external surface of the earbud housing.

14. A system comprising:

an in-ear audio output device comprising:

an earbud housing shaped to fit in a concha of an ear of a wearer of the device;

a body coupled to the earbud housing, the body extending away from an ear canal of the wearer and oriented outside of the ear when the device is worn, the body comprising a top cap comprising a top end oriented towards a helix of the wearer and a bottom end opposite the top end; and a raised feature disposed on the top end of the top cap, the raised feature being proximate to a concha cymba of the wearer and external to the ear when the device is worn.

15. The system of claim 14, further comprising a charging case comprising a case bottom, a case top, and a hinge configured to allow the case top to pivot open and closed relative to the case bottom, wherein the raised feature protrudes from the case bottom when the in-ear audio output device is seated in the charging case.

16. The system of claim 15, wherein the case top pivots relative to the case bottom to a closed position and encases the raised feature when the in-ear audio output device is seated in the charging case.

17. The system of claim 14, wherein:

the raised feature is crescent shaped;

the raised feature comprises a first point on a first end of the crescent shaped feature, a second point on a second end of the crescent shaped feature, and a middle portion between the first point and the second point; and the middle portion extends further from the flat external portion of the body as compared to the first point and the second point.

18. The system of claim 14, wherein the raised feature is less than or equal to 1 mm in height from a flat external portion.

19. The system of claim 14, wherein a bottom portion of the raised feature is contoured to a shape of a human finger.

20. The system of claim 14, further comprising a removably attached stability feature disposed on an external surface of the earbud housing.

* * * * *